United States Patent
Katagiri et al.

(10) Patent No.: US 12,117,625 B2
(45) Date of Patent: Oct. 15, 2024

(54) REFLECTIVE DISPLAY BODY AND ROLL BODY OF LIGHT DIFFUSION CONTROL SHEET

(71) Applicant: LINTEC CORPORATION, Tokyo (JP)

(72) Inventors: Baku Katagiri, Tokyo (JP); Tatsuki Kuramoto, Tokyo (JP); Tetsuya Arazoe, Tokyo (JP); Kentaro Kusama, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 477 days.

(21) Appl. No.: 17/523,145

(22) Filed: Nov. 10, 2021

(65) Prior Publication Data

US 2022/0146719 A1    May 12, 2022

(30) Foreign Application Priority Data

Nov. 11, 2020  (JP) .................................. 2020-188091

(51) Int. Cl.
*G02B 5/00* (2006.01)
*G02B 5/02* (2006.01)
(52) U.S. Cl.
CPC .................................. *G02B 5/0236* (2013.01)
(58) Field of Classification Search
None
See application file for complete search history.

(56) References Cited

U.S. PATENT DOCUMENTS

| | | | |
|---|---|---|---|
| 2016/0070035 A1* | 3/2016 | Kusama | G02B 5/0268 359/599 |
| 2016/0077246 A1* | 3/2016 | Kusama | G02B 5/0268 359/599 |
| 2022/0091308 A1* | 3/2022 | Xu | G02B 5/281 |

FOREIGN PATENT DOCUMENTS

| | | |
|---|---|---|
| JP | 2002-311432 | 10/2002 |
| JP | 2013-210409 | 10/2013 |
| JP | 2014-002187 | 1/2014 |
| JP | 2014-002188 | 1/2014 |
| JP | 6250648 | 12/2017 |

OTHER PUBLICATIONS

Official communication in corresponding Japanese Patent Application No. 2020-188091 dated Feb. 20, 2024, along with English translation.

* cited by examiner

*Primary Examiner* — Gerald J Sufleta, II
(74) *Attorney, Agent, or Firm* — GREENBLUM & BERNSTEIN, P.L.C.

(57) ABSTRACT

A reflective display body configured such that the up-down direction of display content on a display surface can be changed. The reflective display body includes a light diffusion control layer, a display device, and a reflective layer. The light diffusion control layer has a diffusion angle width of 5° or more and 80° or less in which a haze value (%) is 90% or more as measured when one surface of the light diffusion control layer is irradiated with light rays at an incident angle of −70° to 70° with respect to the normal direction of the one surface being 0°. The light diffusion control layer has an acute angle of 7° or more and 83° or less.

7 Claims, 3 Drawing Sheets

REFLECTIVE DISPLAY BODY AND ROLL BODY OF LIGHT DIFFUSION CONTROL SHEET

TECHNICAL FIELD

The present invention relates to a reflective display body including a light diffusion control layer that can transmit and diffuse the incident light within a predetermined incident angle range in a strong and low light loss state and relates also to a roll body of a light diffusion control sheet having such optical characteristics.

BACKGROUND ART

Display bodies such as liquid crystal display devices, organic electroluminescence (EL) displays, and electronic paper include those classified into reflective display bodies including reflective layers. In such reflective display bodies, the display surface of a reflective display body is generally illuminated by a light source such as an indoor light or the sun and/or a light source provided on the display surface side of the display body, and light from these light sources is reflected by the reflective layer into reflected light, which enables good visibility of the display.

When using the reflective display body, the positional relationship between the light source and the viewer is usually not fixed due to the use of an external light source. This may result in a problems in that, depending on the position of the light source, insufficient light reaches the viewer to deteriorate the visibility and the entire display body cannot be illuminated brightly. To solve such a problem, it is conceivable to incorporate a light diffusion plate into the display body. However, simply incorporating a general light diffusion plate may lead to another problem in that the diffusivity necessary for good visibility cannot be sufficiently obtained and, if attempting to achieve high diffusion, light loss due to stray light or backscattering occurs to impair the image clarity. From the viewpoint of solving these problems, in the reflective display bodies, it is considered that a light diffusion control layer that can transmit and diffuse the incident light within a predetermined incident angle range in a strong and low light loss state is provided between the surface on the viewer side and the reflective layer (Patent Document 1, for example). The existence of the above light diffusion control layer allows the light reflected from the reflective layer to be moderately diffused, and the deterioration in the visibility depending on the position of the light source can thus be reduced.

PRIOR ART DOCUMENTS

Patent Documents

[Patent Document 1] JP6250648B

SUMMARY OF THE INVENTION

Problems to be Solved by the Invention

Meanwhile, many smartphones and tablets in recent years have a function of switching the up-down direction of display content in accordance with the vertical posture of the display surface. That is, when the short sides of the display surface are parallel to the ground, the display content is displayed such that the up-down direction of the display content is parallel to the long sides of the display surface, while when the long sides of the display surface are parallel to the ground, the display content is displayed such that the up-down direction of the display content is parallel to the short sides of the display surface.

In the case in which the previously described light diffusion control layer is provided in such a reflective display body configured such that the up-down direction of display content on the display surface can be changed, there is a problem in that when the up-down direction of the display content is changed, the brightness varies significantly and gives uncomfortable feeling to the user.

The present invention has been made in consideration of such actual circumstances and an object of the present invention is to provide a reflective display body that has small brightness variation and does not give uncomfortable feeling to a viewer even when the up-down direction of the display content is changed. Another object of the present invention is to provide a roll body of a light diffusion control sheet that can be suitably used for production of the reflective display body.

Means for Solving the Problems

To achieve the above objects, first, the present invention provides a reflective display body configured such that an up-down direction of display content on a display surface can be changed, the reflective display body comprising: a light diffusion control layer; a display device provided on one surface side of the light diffusion control layer; and a reflective layer provided on a surface side of the display device opposite to the light diffusion control layer, the light diffusion control layer having a diffusion angle width of 5° or more and 80° or less in which a haze value (%) is 90% or more as measured when one surface of the light diffusion control layer is irradiated with light rays at an incident angle of −70° to 70° with respect to a normal direction of the one surface being 0°, the light diffusion control layer having an acute angle of 7° or more and 83° or less, the acute angle being defined as an angle formed between the up-down direction of the display content and a straight line obtained by projecting a light ray specified as a centroid of a transmitted and diffused light onto one surface of the light diffusion control layer, the transmitted and diffused light being generated from the one surface of the light diffusion control layer irradiated with incident light perpendicular to the other surface (Invention 1).

The reflective display body according to the above invention (Invention 1) includes the above-described light diffusion control layer thereby to have small brightness variation when the up-down direction of the display content is changed, and thus does not give uncomfortable feeling to the viewer.

In the above invention (Invention 1), the light diffusion control layer may preferably have a regular internal structure that includes a plurality of regions having a relatively high refractive index in a region having a relatively low refractive index (Invention 2).

In the above invention (Invention 1, 2), the regular internal structure may be preferably a column structure configured such that a plurality of columnar bodies having the relatively high refractive index is densely arranged to stand in the region having the relatively low refractive index (Invention 3).

In the above invention (any of the inventions), the reflective display body may preferably include a front light provided on a surface side of the light diffusion control layer opposite to the display device, the front light may preferably comprise: a light guide member that covers the display surface; and a light source that is in contact with the light guide member and is located at least at a part of a peripheral edge portion of the display surface, and the light source may preferably exist at a position at which a straight line passing through the center of the light source and the center of the display surface is not parallel to any of the up-down direction and right-left direction of the display content when the display surface is viewed in a plane (Invention 4).

Second, the present invention provides a roll body obtained by winding a light diffusion control sheet of a long size, the light diffusion control sheet having a diffusion angle width of 5° or more and 80° or less in which a haze value (%) is 90% or more as measured when one surface of the light diffusion control sheet is irradiated with light rays at an incident angle of −70° to 70° with respect to a normal direction of the one surface being 0°, the light diffusion control sheet having an acute angle of 7° or more and 83° or less, the acute angle being defined as an angle formed between a longitudinal direction of the light diffusion control sheet and a straight line obtained by projecting a light ray specified as a centroid of a transmitted and diffused light onto one surface of the light diffusion control sheet, the transmitted and diffused light being generated from the one surface of the light diffusion control layer irradiated with incident light perpendicular to the other surface (Invention 5).

Advantageous Effect of the Invention

The reflective display body according to the present invention has small brightness variation and does not give uncomfortable feeling to the viewer even when the up-down direction of the display content is changed. Moreover, the roll body of the light diffusion control sheet according to the present invention can be used to efficiently produce the above reflective display body.

EMBODIMENTS FOR CARRYING OUT THE INVENTION

Hereinafter, one or more embodiments of the present invention will be described.
<Reflective Display Body>

Figure 1:
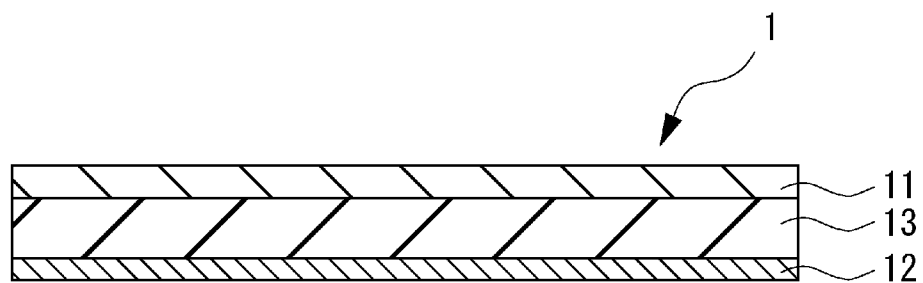
FIG. 1 is a cross-sectional view of an example of the reflective display body according to an embodiment of the present invention.

FIG. 1 illustrates a cross-sectional view of an example of the reflective display body according to an embodiment of the present invention. Reflective display body 1 according to the present embodiment is configured such that the up-down direction of display content on the display surface can be changed.

As illustrated in FIG. 1, the reflective display body 1 includes a light diffusion control layer 11, a display device 13 provided on one surface side of the light diffusion control layer 11, and a reflective layer 12 provided on a surface side of the display device 13 opposite to the light diffusion control layer 11.

The light diffusion control layer 11 has an acute angle of 7° or more and 83° or less with respect to the up-down direction of the display content. More specifically, when one surface of the light diffusion control layer 11 is irradiated with incident light perpendicular to the one surface to generate transmitted and diffused light from the other surface, the acute angle is defined as an angle formed between the up-down direction of the display content and a straight line obtained by projecting a light ray specified as the centroid of the transmitted and diffused light onto the other surface of the light diffusion control layer 11 (this straight line may be referred to as a "centroid projection line," hereinafter).

Figure 2:
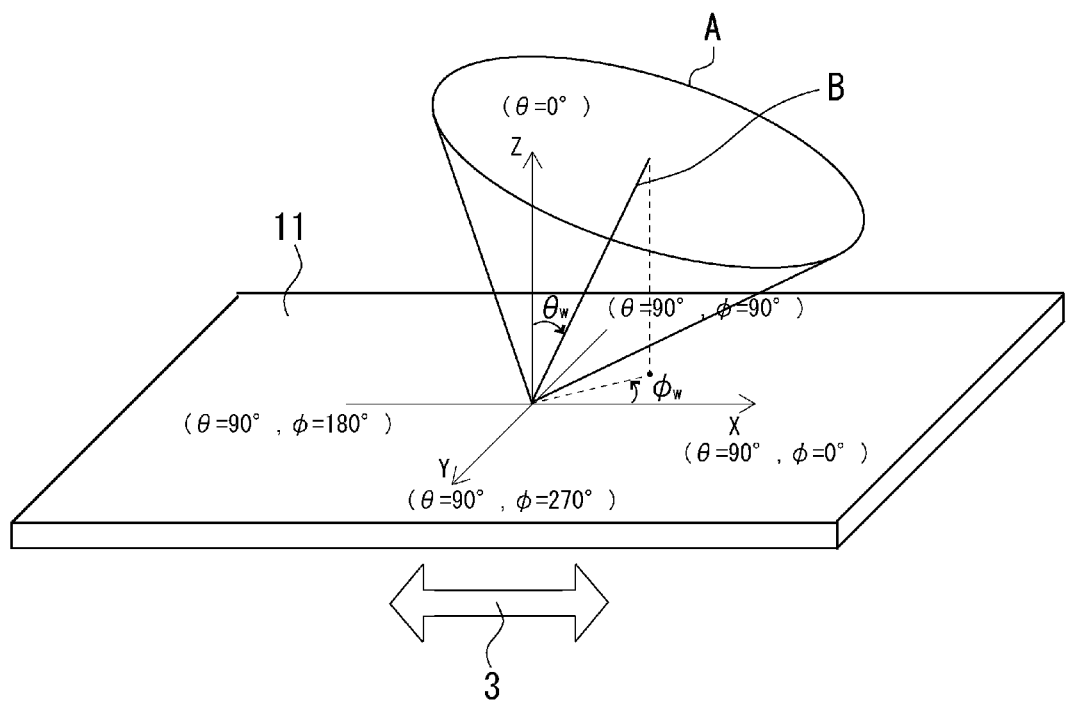
FIG. 2 is a perspective view for describing diffused and transmitted light generated from the light diffusion control sheet in an embodiment of the present invention and a light ray that is the centroid of the diffused and transmitted light.

Here, the above acute angle will be described in more detail with reference to FIG. 2. FIG. 2 is a perspective view for describing the diffused and transmitted light generated from the light diffusion control layer 11 in the present embodiment and a light ray that is the centroid of the diffused and transmitted light. FIG. 2 depicts a state in which one surface (lower side in the plane of the figure) of the light diffusion control layer 11 is irradiated with incident light perpendicular to the one surface thereby to generate diffused and transmitted light A from the other surface (upper side in the plane of the figure). In particular, the diffused and transmitted light A is schematically depicted in which light rays are diffused with a certain spread.

For such transmitted and diffused light A, the diffused light distribution can be measured using a scattering measurement device. According to the measurement, the directions of individual light rays constituting the transmitted and diffused light and the intensities of the light rays can be obtained. Furthermore, on the basis of information on the directions and intensities of the light rays, a light ray B that is the centroid of the transmitted and diffused light A can be specified. The direction of the light ray B can be represented by an azimuth angle $\varphi_w$ and a polar angle $\theta_w$ in the polar coordinate system as described below. Details of a method of measuring the above-described diffused light distribution, a method of specifying the light ray B which is the centroid, and a method of specifying the azimuth angle $\varphi_w$ and polar angle $\theta_w$ of the light ray B are as described in the testing examples, which will be described later.

FIG. 2 depicts the X-axis, Y-axis, and Z-axis for expressing the polar coordinate system. FIG. 2 also depicts a direction 3. This direction 3 is a direction that is the up-down direction of the display content when the reflective display body 1 is configured. Both the X-axis and the Y-axis are present on the surface of the light diffusion control layer 11, the X-axis is parallel to the direction 3, and the Y-axis is orthogonal to the X-axis. The Z-axis is orthogonal to the X-axis and the Y-axis. The positive direction of the X-axis (right direction in the plane of the figure) is set to an azimuth angle of $\varphi=0°$ (polar angle of $\theta=90°$), and with reference to this, azimuth angles of $\varphi=90°$, 180°, and 270° are set counterclockwise. The positive direction of the Z-axis is set to a polar angle of $\theta=0°$.

Then, the previously described acute angle can be determined based on the azimuth angle $\varphi_w$ of the light ray B represented in the polar coordinate system of FIG. 2. That is, when the azimuth angle $\varphi_w$ is 0° or more and 90° or less, the azimuth angle $\varphi_w$ itself is the previously described acute angle. When the azimuth angle $\varphi_w$ is more than 90° and less than 180°, an angle obtained by subtracting the azimuth angle $\varphi_w$ from 180° is the previously described acute angle. When the azimuth angle $\varphi_w$ is 180°, 0° is the previously described acute angle. When the azimuth angle $\varphi_w$ is more than 180° and less than 270°, an angle obtained by subtracting 180° from the azimuth angle $\varphi_w$ is the previously described acute angle. When the azimuth angle $\varphi_w$ is 270°, 90° is the previously described acute angle. When the azimuth angle $\varphi_w$ is more than 270° and less than 360°, an angle obtained by subtracting the azimuth angle $\varphi_w$ from 360° is the previously described acute angle.

When the acute angle thus specified is 7° or more and 83° or less, in the reflective display body 1 according to the present embodiment, the direction of light diffusion by the light diffusion control layer 11 is tilted by the above acute angle. This allows the reflective display body 1 according to the present embodiment to have small brightness variation with respect to switching of the up-down direction of the display content, as will be described later.

From the viewpoint of further reducing the brightness variation, the previously described acute angle may be preferably 10° or more and 80° or less and particularly preferably 15° or more and 75° or less.

Additionally or alternatively, the reflective display body 1 according to the present embodiment can be adjusted so as to give priority to the brightness of the display content while keeping the brightness variation as described above at an acceptable level for the viewer. In this case, a smaller acute angle of the acute angle formed between the previously described centroid projection line and the up-down direction of the display content and the acute angle formed between the previously described centroid projection line and the right-left direction of the display content may be preferably 7° or more and 45° or less, more preferably 8° or more and 20° or less, particularly preferably 9° or more and 15° or less, and further preferably 10° or more and 13° or less.

The polar angle $\theta_w$ of the light ray B may have to be more than 0° and less than 90° from the viewpoint of making the display on the reflective display body 1 brighter. From the same viewpoint, the polar angle $\theta_w$ of the light ray B may be preferably 2° or more, more preferably 5° or more, particularly preferably 10° or more, and further preferably 15° or more. From the same viewpoint, the polar angle $\theta_w$ of the light ray B may be preferably 70° or less, more preferably 60° or less, particularly preferably 40° or less, and further preferably 20° or less.

The reason why the reflective display body 1 according to the present embodiment has a small brightness variation with respect to the switching of the up-down direction of the display content may be explained as follows. As illustrated in FIG. 2, in the reflective display body 1 according to the present embodiment, the transmitted and diffused light A is tilted in a direction that is neither parallel nor orthogonal to the direction 3 (up-down direction of the display content). In particular, the initial up-down direction of the display and the direction of the transmitted and diffused light A, which is tilted as described above, have a predetermined angle (7° or more and 83° or less).

In such a reflective display body 1, when visually recognized in the initial up-down direction, the external light incident on the reflective display body 1 can be directed to the viewer by the light diffusion control layer 11; as a result, the viewer can visually recognize the display with a constant brightness. On the other hand, even when the up-down direction of the reflective display body 1 is changed and the initial right-left direction is set as a new up-down direction, the reflected light can be directed to the viewer by the light diffusion control layer 11 in the same manner, and also in this case, the viewer can visually recognize the display with a constant brightness. As a result, the reflective display body 1 according to the present embodiment is less likely to cause a difference in brightness even when the up-down direction of the display is changed.

In the light diffusion control layer 11 of the present embodiment, the diffusion angle width in which the haze value (%) is 90% or more is 5° or more and 80° or less. Here, the haze value is measured when one surface of the light diffusion control layer 11 is irradiated with light rays along the initial up-down direction at an incident angle of −70° to 70° with respect to the normal direction of the one surface being 0°. When the above diffusion angle width is 5° or more, it is easy to reduce the difference in brightness when the up-down direction is changed. From such a viewpoint, the above diffusion angle width may be preferably 10° or more, particularly preferably 15° or more, further preferably 20° or more, and most preferably 40° or more. On the other hand, when the diffusion angle width is 80° or less, it is easy to increase the brightness in the up-down direction. From such a viewpoint, the above diffusion angle width may be preferably 70° or less and particularly preferably 60° or less. The above diffusion angle width can be measured using a variable haze meter, and a specific measurement method is as described in the testing example, which will be described later.

1. Light Diffusion Control Layer

The light diffusion control layer 11 in the present embodiment is not limited in its internal structure, composition, or the like, provided that it satisfies the previously described conditions for angles and the above-described diffusion angle width. From the viewpoint of readily satisfying these desired physical properties, however, the light diffusion control layer 11 may preferably have a regular internal structure that includes a plurality of regions having a relatively high refractive index in a region having a relatively low refractive index.

(1) Regular Internal Structure

The above-described regular internal structure refers to an internal structure configured such that a plurality of regions having a relatively high refractive index is arranged with a predetermined regularity in a region having a relatively low refractive index. For example, it refers to an internal structure configured such that, when viewing a cross section obtained by cutting the light diffusion control layer 11 along a plane parallel to the surface of the light diffusion control layer 11, the regions having a relatively high refractive index are repeatedly arranged at a similar pitch along at least one direction in the above cross section in the region having a relatively low index. Thus, the regular internal structure as referred to herein has a feature that the regions having a relatively high refractive index extend in the thickness direction of the light diffusion control layer 11, and this feature is distinguished from those of a phase-separation structure in which one phases exist in the other phase without clear regularity or a sea-island structure in which approximately spherical island components exist in a sea component.

According to the above regular internal structure, the incident light which is incident on the surface of the light diffusion control layer 11 within a predetermined incident angle range can exit the light diffusion control layer 11 while being strongly diffused with a predetermined opening angle. On the other hand, when the incident light is at an angle that falls outside the above incident angle range, the incident light can transmit through the light diffusion control layer 11 without being diffused or exit the light diffusion control layer 11 with weaker diffusion than that in the case of the incident light within the incident angle range.

In the above regular internal structure, the regions having a relatively high refractive index may preferably extend from one surface side toward the other surface side of the light diffusion control layer 11, and in this case the straight line parallel to the extending direction of the regions may be preferably tilted with respect to the thickness direction of the light diffusion control layer 11. This allows the light diffusion control layer 11 of the present embodiment to readily satisfy desired physical properties.

Additionally or alternatively, the above regular internal structure may be preferably a column structure configured such that a plurality of columnar bodies having a relatively high refractive index is densely arranged to stand in a region having a relatively low refractive index, and also in this case the columnar bodies may be preferably tilted with respect to the thickness direction of the light diffusion control layer 11. This allows the light diffusion control layer 11 of the present embodiment to more readily satisfy the desired physical properties. It is presumed that the above tilt angle and the previously described polar angle $\theta_w$ have a certain correlation.

When an image creating body is arranged parallel to the surface of the light diffusion control layer 11, the incident light within the above incident angle range is diffused due to the above column structure, and the diffused light has a circular shape or an approximately circular shape (elliptical shape or the like) that spreads in any direction. On the other hand, in the case of the above weak diffusion due to the incident light outside the above incident angle range, the diffused light is in a crescent shape.

In the above column structure, the difference between the refractive index of the regions (columnar bodies) having a relatively high refractive index and the refractive index of the region having a relatively low refractive index may be preferably 0.01 or more and particularly preferably 0.1 or more. When the above difference is 0.01 or more, effective diffusion can be performed. The upper limit of the above difference is not particularly limited and may be, for example, 0.3 or less.

Preferably, the above-described columnar bodies may have a structure in which the diameter increases from one surface to the other surface of the light diffusion control layer 11. The columnar bodies having such a structure may readily change the traveling direction of light parallel to the extending direction of the columnar bodies as compared with columnar bodies in which the diameter does not substantially change from one surface to the other surface. This allows the light diffusion control layer 11 to effectively diffuse light.

The maximum value of the diameter in the cross sections when the columnar bodies are cut along a plane parallel to the surface of the light diffusion control layer 11 may be preferably 0.1 µm or more and particularly preferably 1 µm or more. From another aspect, the maximum value may be preferably 15 µm or less and particularly preferably 5 µm or less. When the maximum value of the diameter falls within the above range, the light diffusion control layer 11 can effectively diffuse light. The shape of the above cross sections of the columnar bodies is not particularly limited, but may be preferably, for example, a circle, an ellipse, a polygonal shape, an irregular shape, or other similar shape.

In the above-described column structure, the distance between adjacent columnar bodies may be preferably 0.1 µm or more and particularly preferably 1 µm or more. From another aspect, the above distance may be preferably 15 µm or less and particularly preferably 5 µm or less. When the distance between adjacent columnar bodies falls within the above range, the light diffusion control layer 11 can effectively diffuse light.

In the above-described column structure, when an extending straight line of the columnar bodies is projected onto one surface of the light diffusion control layer 11, a straight line obtained by the projection and the up-down direction of display content of the reflective display body 1 may preferably form a certain angle that is neither parallel nor orthogonal. This angle is presumed to have a correlation with the previously described azimuth angle $\varphi_w$.

The dimensions relating to the regular internal structure of the column structure described above, the direction/angle of the tilted columnar bodies, etc. can be measured by observing the cross section of the column structure using an optical digital microscope.

The regular internal structure of the light diffusion control layer 11 in the present embodiment may also be a structure obtained by modifying the above-described column structure. For example, the light diffusion control layer may have, as the internal structure, a structure in which the columnar bodies in the above-described column structure are bent at the middle in the thickness direction of the light diffusion control layer 11. Additionally or alternatively, the light diffusion control layer 11 may have a column structure with two or more regions of columnar bodies having different tilt angles in the thickness direction of the light diffusion control layer 11.

(2) Composition

From the viewpoint of readily forming the regular internal structure as described above, the composition of the light diffusion control layer 11 in the present embodiment may be preferably obtained by curing a composition for light diffusion control layer that contains a high refractive index component and a low refractive index component having a refractive index lower than that of the high refractive index component. In particular, each of the high refractive index component and the low refractive index component may preferably have one or two polymerizable functional groups.

(2-1) High Refractive Index Component

Preferred examples of the above high refractive index component include (meth)acrylic ester that contains an aromatic ring, and (meth)acrylic ester that contains a plurality of aromatic rings may be particularly preferred. Examples of (meth)acrylic ester that contains a plurality of aromatic rings include those in which a part thereof is substituted with halogen, alkyl, alkoxy, alkyl halide, or the like, such as biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth)acrylate, anthracyloxyalkyl (meth)acrylate, and benzylphenyloxyalkyl (meth)acrylate. Among these, biphenyl (meth)acrylate may be preferred from the viewpoint of readily forming a good regular internal structure. Specifically, o-phenylphenoxyethyl acrylate, o-phenylphenoxyethoxyethyl acrylate, or the like may be preferred. In the present specification, (meth)acrylic acid means both the acrylic acid and the methacrylic acid. The same applies to other similar terms.

The molecular weight (weight-average molecular weight) of the high refractive index component may be preferably 2,500 or less and particularly preferably 1,000 or less. From another aspect, the molecular weight (weight-average molecular weight) of the high refractive index component may be preferably 150 or more and particularly preferably 250 or more. When the molecular weight (weight-average molecular weight) of the high refractive index component falls within the above range, the light diffusion control layer 11 having a desired regular internal structure can be readily formed. When the theoretical molecular weight of the above high refractive index component can be specified based on the molecular structure, the molecular weight (weight-average molecular weight) of the high refractive index component refers to the theoretical molecular weight (molecular weight that may not be the weight-average molecular weight). On the other hand, when it is difficult to specify the above-described theoretical molecular weight due to the above high refractive index component being a polymer component, for example, the molecular weight (weight-average molecular weight) of the high refractive index component refers to a weight-average molecular weight obtained as a standard polystyrene-equivalent value that is measured using a gel permeation chromatography (GPC) method. As used in the present specification, the weight-average molecular weight refers to a value that is measured as the standard polystyrene equivalent value using the GPC method.

The refractive index of the high refractive index component may be preferably 1.45 or more, more preferably 1.50 or more, and particularly preferably 1.56 or more. From another aspect, the refractive index of the high refractive index component may be preferably 1.70 or less, particularly preferably 1.65 or less, and further preferably 1.59 or less. When the refractive index of the high refractive index component falls within the above range, the light diffusion control layer 11 having a desired regular internal structure can be readily formed. As used in the present specification, the refractive index means the refractive index of a certain component before curing the composition for light diffusion control layer, and the refractive index is measured in accordance with JIS K0062: 1992.

The content of the high refractive index component in the composition for light diffusion control layer may be preferably 25 mass parts or more, particularly preferably 40 mass parts or more, and further preferably 50 mass parts or more with respect to 100 mass parts of the low refractive index component. From another aspect, the content of the high refractive index component in the composition for light diffusion control layer may be preferably 400 mass parts or less, particularly preferably 300 mass parts or less, and further preferably 200 mass parts or less with respect to 100 mass parts of the low refractive index component. When the content of the high refractive index component falls within such ranges, the regions derived from the high refractive index component and the region derived from the low refractive index component exist with a desired ratio in the regular internal structure of the light diffusion control layer 11 formed. As a result, the light diffusion control layer 11 having a desired regular internal structure can be readily formed.

(2-2) Low Refractive Index Component

Preferred examples of the above low refractive index component include urethane (meth)acrylate, a (meth)acrylic-based polymer having a (meth)acryloyl group in a side chain, a (meth)acryloyl group-containing silicone resin, and an unsaturated polyester resin, but it may be particularly preferred to use urethane (meth)acrylate.

The above urethane (meth)acrylate may be preferably formed of (a) a compound that contains at least two isocyanate groups, (b) polyalkylene glycol, and (c) hydroxyalkyl (meth)acrylate.

Preferred examples of the above-described (a) compound that contains at least two isocyanate groups include aromatic polyisocyanates such as 2,4-tolylene diisocyanate, 2,6-tolylene diisocyanate, 1,3-xylylene diisocyanate, and 1,4-xylylene diisocyanate, aliphatic polyisocyanates such as hexamethylene diisocyanate, alicyclic polyisocyanates such as isophorone diisocyanate (IPDI) and hydrogenated diphenylmethane diisocyanate, biuret bodies and isocyanurate bodies thereof, and adduct bodies (e.g., a xylylene diisocyanate-based trifunctional adduct body) that are reaction products with low molecular active hydrogen-containing compounds such as ethylene glycol, propylene glycol, neopentyl glycol, trimethylol propane, and castor oil. Among these, an alicyclic polyisocyanate may be preferred, and an alicyclic diisocyanate that contains only two isocyanate groups may be particularly preferred.

Preferred examples of the above-described (b) polyalkylene glycol include polyethylene glycol, polypropylene glycol, polybutylene glycol, and polyhexylene glycol, among which polypropylene glycol may be preferred.

The weight-average molecular weight of the (b) polyalkylene glycol may be preferably 2,300 or more, particularly preferably 3,000 or more, and further preferably 4,000 or more. From another aspect, the weight-average molecular weight of the (b) polyalkylene glycol may be preferably 19,500 or less, particularly preferably 14,300 or less, and further preferably 12,300 or less.

Preferred examples of the above-described (c) hydroxyalkyl (meth)acrylate include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Synthesis of the urethane (meth)acrylate using the above-described components (a) to (c) as the materials can be performed in a commonly-used method. In such a method, from the viewpoint of efficiently synthesizing the urethane (meth)acrylate, the compounding ratio of the components (a), (b), and (c) as the molar ratio may be preferably a ratio of 1-5:1:1-5 and particularly preferably a ratio of 1-3:1:1-3.

The weight-average molecular weight of the low refractive index component may be preferably 3,000 or more, particularly preferably 5,000 or more, and further preferably 7,000 or more. From another aspect, the weight-average molecular weight of the low refractive index component may be preferably 20,000 or less, particularly preferably 15,000 or less, and further preferably 13,000 or less. When the weight-average molecular weight of the low refractive index component falls within the above range, the light diffusion control layer 11 having a desired regular internal structure can be readily formed.

The refractive index of the low refractive index component may be preferably 1.59 or less, more preferably 1.50 or less, and particularly preferably 1.48 or less. From another aspect, the refractive index of the low refractive index component may be preferably 1.30 or more, particularly preferably 1.40 or more, and particularly preferably 1.46 or more. When the refractive index of the low refractive index component falls within the above range, the light diffusion control layer 11 having a desired regular internal structure can be readily formed.

(2-3) Other Components

The previously described composition for light diffusion control layer may contain other additives in addition to the high refractive index component and the low refractive index component. Examples of other additives include a multifunctional monomer (compound having three or more polymerizable functional groups), a photopolymerization initiator, an antioxidant, an ultraviolet absorber, a light stabilizer, an antistatic, a polymerization accelerator, a polymerization inhibitor, an infrared absorber, a plasticizer, a diluting solvent, and a leveling agent.

The composition for light diffusion control layer may preferably contain a photopolymerization initiator among the above-described additives. When the composition for light diffusion control layer contains a photopolymerization initiator, the light diffusion control layer 11 having a desired regular internal structure can be readily and efficiently formed.

Examples of the photopolymerization initiator include benzoin, benzoin methyl ether, benzoin ethyl ether, benzoin isopropyl ether, benzoin-n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholino-propan-1-one, 4-(2-hydroxyethoxy)phenyl-2-(hydroxy-2-propyl)ketone, diethylaminobenzophenone, dichlorobenzophenone, 2-methylanthraquinone, 2-ethylanthraquinone, 2-tert-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylaminebenzoic ester, and oligo[2-hydroxy-2-methyl-1-[4-(1-methylvinyl)phenyl]propane]. These may each be used alone, or two or more types may also be used in combination.

When the photopolymerization initiator is used, the content of the photopolymerization initiator in the composition for light diffusion control layer may be preferably 0.2 mass parts or more, particularly preferably 0.5 mass parts or more, and further preferably 1 mass part or more with respect to 100 mass parts of the total amount of the high refractive index component and the low refractive index component. From another aspect, the content of the photopolymerization initiator may be preferably 20 mass parts or less, particularly preferably 15 mass parts or less, and further preferably 10 mass parts or less with respect to 100 mass parts of the total amount of the high refractive index component and the low refractive index component. When the content of the photopolymerization initiator in the composition for light diffusion control layer falls within the above range, the light diffusion control layer 11 can be readily and efficiently formed.

(2-4) Preparation of Composition for Light Diffusion Control Layer

The composition for light diffusion control layer can be prepared by uniformly mixing the previously described high refractive index component and low refractive index component and, if desired, other additives such as a photopolymerization initiator.

In the above mixing, a uniform composition for light diffusion control layer may be obtained by stirring it while heating it to a temperature of 40° C. to 80° C. A diluting solvent may be added and mixed so that the obtained composition for light diffusion control layer has a desired viscosity.

(3) Thickness

The thickness of the light diffusion control layer 11 in the present embodiment may be preferably 30 μm or more, particularly preferably 45 μm or more, and further preferably 60 μm or more. From another aspect, the above thickness may be preferably 1,000 μm or less, particularly preferably 500 μm or less, and further preferably 200 μm or less. When the thickness of the light diffusion control layer 11 falls within such a range, the reflective display body 1 can readily achieve brighter display and further reduce the difference in brightness of the display when the up-down direction of the display content is changed.

(4) Method of Producing Light Diffusion Control Layer

The method of producing the light diffusion control layer 11 in the present embodiment is not particularly limited, and a conventionally known method can be used. For example, one surface of a process sheet may be coated with the previously described composition for light diffusion control layer to form a coating film, and one surface of a release sheet (in particular, the release surface) is then attached to the surface of the coating film opposite to the process sheet. Subsequently, the above coating film is irradiated with active energy rays via the process sheet or the release sheet to cure the coating film, and the light diffusion control layer 11 can thereby be formed. Thus, by laminating the release sheet on the above coating film, the light diffusion control layer 11 having a uniform thickness can readily be formed while maintaining the gap between the release sheet and the process sheet and suppressing the crushing of the coating film.

In the above-described method of forming the light diffusion control layer 11, a long process sheet and a long release sheet may be used. In this case, it is preferred to form the light diffusion control layer 11 through sequentially performing the coating with the composition for light diffusion control layer, the attachment of the release sheet, and the irradiation with active energy rays while moving the process sheet in the longitudinal direction. It is also possible to obtain a roll body by winding the long light diffusion control layer 11 thus obtained. In this operation, the light diffusion control layer 11 may be wound around a core material if necessary. The formation of the light diffusion control layer 11 and the subsequent winding of the light diffusion control layer 11 may be performed continuously. That is, the formation of coating film as previously described and its curing may be performed in the upstream of the flow direction, and the formed light diffusion control layer 11 may be wound in the downstream of the flow direction.

Examples of the method for the above-described coating include a knife coating method, a roll coating method, a bar coating method, a blade coating method, a die coating method, and a gravure coating method. The composition for light diffusion control sheet may be diluted using a solvent as necessary.

Figure 3:
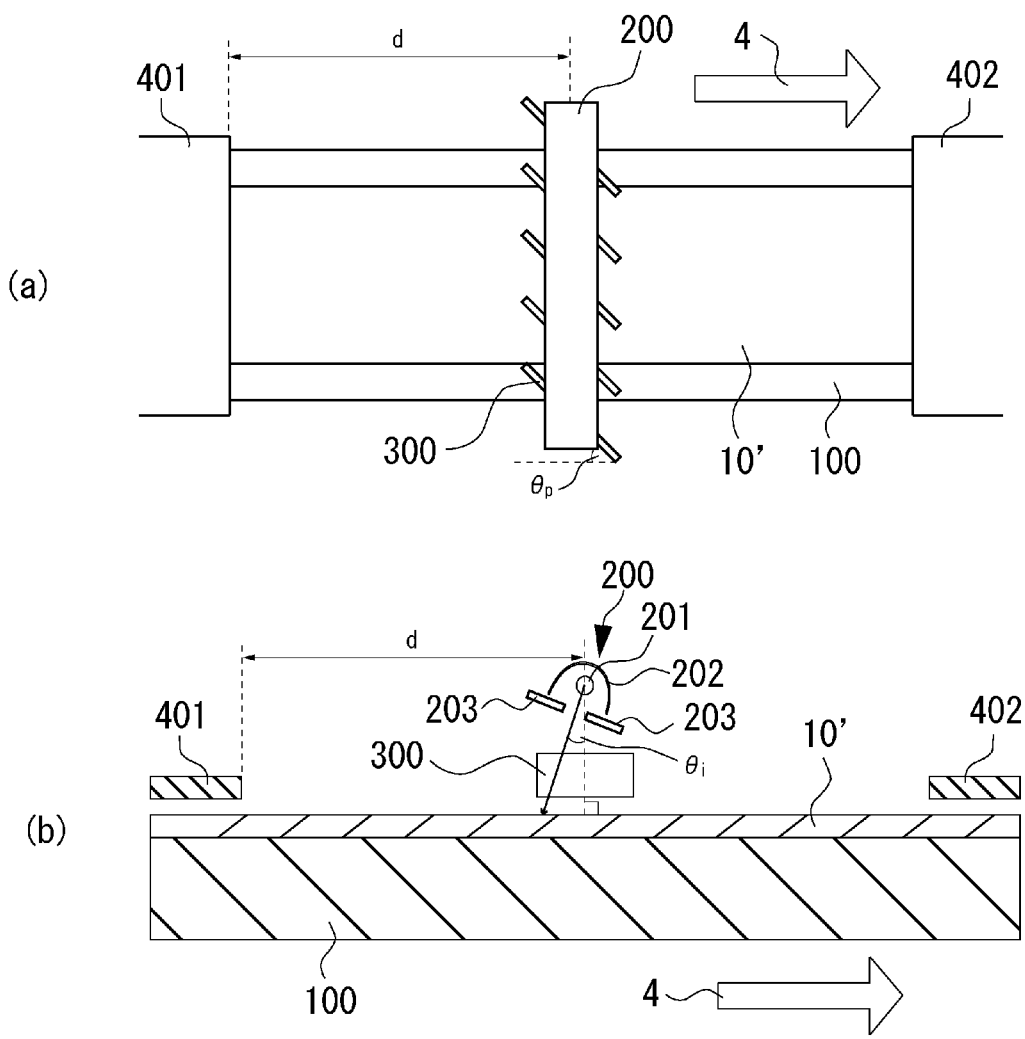
FIG. 3 is a set of diagrams illustrating an example of a method of producing the light diffusion control sheet in an embodiment of the present invention.

When the coating film is cured, the irradiation condition for the active energy rays can be controlled thereby to adjust the previously described physical properties (in particular, the azimuth angle $\varphi_w$ of the light ray B which is the centroid) of the light diffusion control layer 11 in the present embodiment to desired ranges. FIGS. 3(*a*) and 3(*b*) schematically illustrate an example of a state in which the coating film is irradiated with active energy rays. In particular, FIGS. 3(*a*) and 3(*b*) depict a state of irradiating the coating film of the composition for light diffusion control layer, which is formed on a long process sheet, with active energy rays while moving the coating film in a predetermined direction (flow direction 4 in the figure). More specifically, a coating film 10' is irradiated with active energy rays from an optical unit 200 while being transferred on a conveyor 100 in the flow direction 4. FIG. 3(*a*) illustrates a state in which such a state is viewed from above, and FIG. 3(*b*) illustrates a cross section viewed from the side.

As illustrated, it is preferred to provide a plurality of irradiation light parallelizing members 300 for guiding the light from the light source in a predetermined direction between the optical unit 200 and the coating film 10'. In particular, it is preferred to arrange all of the plurality of irradiation light parallelizing members 300 to be tilted at a predetermined angle (angle $\theta_p$ in FIG. 3(*a*)) with respect to the flow direction 4. The angle $\theta_p$ may be preferably 10° or more, particularly preferably 20° or more, and further preferably 30° or more from the viewpoint of achieving a desired azimuth angle $\varphi_w$. From the same viewpoint, the angle $\theta_p$ may be preferably 80° or less, particularly preferably 70° or less, and further preferably 60° or less.

Further, as illustrated, an entry-side light-shielding plate 401 and an exit-side light-shielding plate 402 for blocking light from the optical unit 200 and other external light are provided, respectively, on the upstream side and the downstream side with respect to the optical unit 200. Here, it is preferred to control the distance (distance indicated by d in the figure) from a position at which the entry-side light-shielding plate 401 is terminated and the coating film 10' is exposed to a position of the optical unit 200 (in particular, a linear light source 201) from the viewpoint of achieving the azimuth angle $\varphi_w$. In particular, the distance d may be preferably 10 mm or more, particularly preferably 20 mm or more, and further preferably 30 mm or more. From another aspect, the distance d may be preferably 1,000 mm or less, particularly preferably 750 mm or less, and further preferably 500 mm or less.

As illustrated in FIG. 3(*b*), the above optical unit 200 mainly includes a linear light source 201, a light collecting mirror 202, and a pair of light source shading plates 203. Here, by adjusting the orientation and position of the light collecting mirror 202 and the light source shading plate 203, the irradiation angle with the irradiation light from the linear light source 201 (the angle indicated by $\theta_i$ in the figure) can be controlled. In particular, it is preferred to control the irradiation angle $\theta_i$ from the viewpoint of achieving a desired azimuth angle $\varphi_w$. In this case, the irradiation angle $\theta_i$ may be preferably 1° or more, particularly preferably 2° or more, and further preferably 5° or more. From another aspect, the above irradiation angle $\theta_i$ may be preferably 80° or less, particularly preferably 70° or less, and further preferably 60° or less.

The above active energy rays refer to electromagnetic wave or charged particle radiation having an energy quantum, and specific examples of the active energy rays include ultraviolet rays and electron rays. Among the active energy rays, ultraviolet rays may be particularly preferred because of easy management.

When forming the column structure using ultraviolet rays as the active energy rays, it may be preferred to set the irradiation condition such that the peak illuminance on the coating film surface is 0.1 to 10 mW/cm$^2$. The peak illuminance as referred to herein means a measured value at a portion at which the active energy rays irradiating the coating film surface give the maximum value. Additionally or alternatively, it may be preferred to set the integrated light amount on the coating film surface to 5 to 200 mJ/cm$^2$.

From the viewpoint of completing more reliable curing, it may also be preferred to perform the irradiation with commonly-used active energy rays (active energy rays for which the process of converting the rays into parallel light or strip-shaped light is not performed, scattered light) after performing the curing using the parallel light or strip-shaped light as previously described.

2. Reflective Layer

The reflective layer 12 in the present embodiment is not particularly limited and may be any of reflective layers used for general reflective display bodies. Preferred examples of the reflective layer 12 include a metal vapor-deposited film obtained by vapor-depositing a metal on a given surface. Preferred examples of such a metal include aluminum, silver, and nickel.

The thickness of the reflective layer 12 made of the above-described metal vapor-deposited film is not particularly limited, but may be preferably, for example, 1 nm or more, particularly preferably 10 nm or more, and further preferably 50 nm or more. From another aspect, the above thickness may be preferably 3 μm or less, particularly preferably 2 μm or less, and further preferably 1 μm or less.

The reflective layer 12 made of the above-described metal vapor-deposited film may be provided on the surface of a resin film as a support body. Examples of such a resin film for use include polyethylene terephthalate films, polyethylene naphthalate films, polybutylene terephthalate films, polyethylene films, polypropylene films, polybutene films, polybutadiene films, polymethylpentene films, polyvinyl chloride films, vinyl chloride copolymer films, polyurethane films, ethylene vinyl acetate films, ionomer resin films, ethylene/(meth)acrylic acid copolymer films, ethylene/(meth)acrylic ester copolymer films, polystyrene films, polycarbonate films, polyimide films, fluorine resin films, and liquid crystal polymer films. Crosslinked films of these films may also be used. The resin film may also be a laminated film of these films.

The reflective layer 12 in the present embodiment may be a reflective electrode. The reflective electrode may be incorporated, for example, in the display device 13. In general, the reflective electrode is not provided to cover the entire display surface of the reflective display body 1, and there is a portion on which the electrode is not formed. In the reflective display body 1 including a reflective electrode, therefore, external light can be reflected by the reflective electrode, while on the other hand, light from a backlight or the like provided on the back surface of the display device can be transmitted through the portion on which the electrode is not formed. The material of the reflective electrode as the reflective layer 12 in the present embodiment is not particularly limited and can be formed of a general material for reflective electrodes.

In the reflective display body 1 illustrated in FIG. 1, the reflective layer 12 is drawn as a component independent of the display device 13 and is also drawn so as to exist in the entire area in the lateral direction (the entire area of the surface of the display device 13 opposite to the light diffusion control layer 11). However, the reflective display body 1 according to the present embodiment is not limited to the display body illustrated in FIG. 1 and encompasses a display body that includes the above-described reflective electrode as the reflective layer 12.

The reflective layer 12 in the present embodiment may also be a reflective layer having semi-transmissive and semi-reflective properties that exhibits both a property of transmitting light and a property of reflecting light.

3. Display Device

The display device 13 in the present embodiment is not particularly limited and may be a display device incorporated in a general reflective display body. Examples of the display device 13 include liquid crystal displays, electronic paper, electrophoresis displays, MEMS displays, and solid crystal displays, and the display device 13 may also be obtained by laminating a touch panel on any of these displays.

4. Other Constitutional Elements

The reflective display body 1 in the present embodiment may include one or more constitutional members other than the above-described light diffusion control layer 11, reflective layer 12, and display device 13.

For example, a front light may be provided on the surface side of the light diffusion control layer 11 opposite to the display device 13 (i.e., the surface side of the reflective display body 1 facing the viewer). Preferred examples of the front light include, but are not limited to, a front light that includes a light source and a light guide member. The above light guide member may be preferably provided so as to cover the surface side of the light diffusion control layer 11 opposite to the display device 13. Additionally or alternatively, the light source may be preferably provided at least at a part of the peripheral edge portion of the display surface and provided so as to be in contact with the above light guide member.

The above light guide member guides the light emitted from the light source to the display surface. The configuration of the light guide member is not limited, provided that it exerts such an action, and the light guide member may be, for example, one provided therein with irregularities that form prisms or one coated with a reflective material containing particles that reflect light.

The position of the above light source is not limited, provided that the display surface can be irradiated with light via the light guide member, and the light source may be provided, for example, at a position on the upper side (upper side for the viewer) of the peripheral edge portion of the display surface. However, from the viewpoint of efficiently diffusing the light from the front light in the front direction, the light source may be preferably provided at a position at which a straight line passing through the center of the light source and the center of the display surface is not parallel to any of the up-down direction and right-left direction of the display content when the display surface is viewed in a plane. This enables the display of a brighter image.

Regarding the position of the above light source, from the viewpoint of the brightness, when the display surface is viewed in a plane, the angle formed between the straight line passing through the center of the light source and the center of the display surface and the straight line parallel to the up-down direction of the display content may be preferably more than 0° and less than 90°, more preferably 5° or more and 85° or less, particularly preferably 10° or more and 80° or less, and further preferably 15° or more and 75° or less.

Additionally or alternatively, regarding the position of the above light source, from the viewpoint of the brightness, when the light diffusion control layer 11 is viewed in a plane, the absolute value of the angle formed between the straight line passing through the center of the light source and the center of the display surface and the straight line obtained by projecting the previously described light ray B (right ray which is the centroid of the diffused and transmitted light) onto the display surface may be preferably 30° or less, more preferably 20° or less, particularly 10° or less, and further preferably 5° or less.

A surface coat layer, a cover panel, or the like may be provided on the surface side of the light diffusion control layer 11 opposite to the reflection layer 12 as a constitutional member other than the front light. Additionally or alternatively, a backlight may be provided on the surface side of the display device 13 opposite to the light diffusion control layer 11.

The shape of the display surface of the reflective display body 1 according to the present embodiment is not particularly limited, but typically, the display surface may preferably have a rectangular shape. In this case, the display surface may be a rectangle composed of a pair of long sides and a pair of short sides or may also be a square whose all sides have the same length. When the display surface has such a rectangular shape, the display surface may be preferably configured such that the initial up-down direction of the display content is parallel to any one of the sides of the above rectangle. Additionally or alternatively, the shape of the display surface may be a quadrangular shape other than a rectangular shape, such as a diamond shape, a trapezoidal shape, or a parallelogram, a circular shape such as a perfect circle or an ellipse, or an irregular shape other than these.

5. Physical Properties of Reflective Display Body

The reflective display body 1 according to the present embodiment may preferably satisfy the following reflectance, brightness, and difference in brightness for a sample obtained by laminating the light diffusion control layer 11 and the reflective layer 12 on each other.

This will be described more specifically. In the reflective display body 1 according to the present embodiment, when the surface of the above sample on the light diffusion control layer 11 side is irradiated with light rays at an incident angle of 30° from the upper side in the primary up-down direction of the display content, the reflectance of the reflected light rays in the front direction (reflectance in the up orientation) may be preferably 110% or more, particularly preferably 140% or more, further preferably 200% or more, and most preferably 270% or more. The upper limit of the reflectance in the up orientation is not particularly limited and may be, for example, 400% or less in an embodiment or even 300% or less in another embodiment.

Additionally or alternatively, when the surface of the above sample on the light diffusion control layer 11 side is irradiated with light rays at an incident angle of 30° from the right side in the primary right-left direction of the display content, the reflectance of the reflected light rays in the front direction (reflectance in the right orientation) may be preferably 100% or more, particularly preferably 110% or more, further preferably 120% or more, and most preferably 130% or more. The upper limit of the reflectance in the right orientation is not particularly limited and may be, for example, 200% or less in an embodiment or even 150% or less in another embodiment.

The above reflectance is calculated as a ratio of the amount of reflected light rays to a reference value. The reference value as used herein refers to the amount of light rays reflected in the front direction when the reflection surface of a standard reflector is irradiated with light rays at an incident angle of 30°. Specific methods of measuring the above-described reflectance in the up orientation and reflectance in the right orientation are as described in the testing examples, which will be described later.

Additionally or alternatively, in the reflective display body 1 according to the present embodiment, the brightness represented as the average value of the reflectance in the up orientation and the reflectance in the right orientation obtained as described above may be preferably 110% or more, particularly preferably 130% or more, further preferably 160% or more, and most preferably 210% or more. The upper limit of the above brightness is not particularly limited and may be, for example, 400% or less in an embodiment or even 300% or less in another embodiment.

Additionally or alternatively, in the reflective display body 1 according to the present embodiment, the difference in brightness between the case of illumination from the up orientation and the case of illumination from the right orientation, which is calculated based on the following formula, may be preferably 40% or less, particularly preferably 38% or less, and further preferably 37% or less. The lower limit of the above difference in brightness is not particularly limited and may be, for example, 0% or more in an embodiment, 5% or more in another embodiment, or even 30% or more in still another embodiment.

Difference in brightness (%)=(Absolute value of difference between reflectance in up orientation and reflectance in right orientation)/(Sum of reflectance in up orientation and reflectance in right orientation)×100

By including the light diffusion control layer 11, the reflective display body 1 according to the present embodiment can achieve the excellent reflectance and brightness as described above and well reduce the difference in brightness as described above when the up-down direction of the display content is changed.

6. Method of Producing Reflective Display Body

The method of producing the reflective display body 1 according to the present embodiment is not particularly limited, and the reflective display body 1 can be produced using a conventional production method. For example, the reflective display body 1 can be obtained through producing the light diffusion control layer 11, the display device 13, and the reflective layer 12 and then laminating them. The reflective display body 1 can also be obtained through producing the display device 13 in which the reflective layer 12 is incorporated and then laminating the display device 13 on the light diffusion control layer 11 which is separately produced.

<Roll Body of Light Diffusion Control Sheet>

Figure 4:
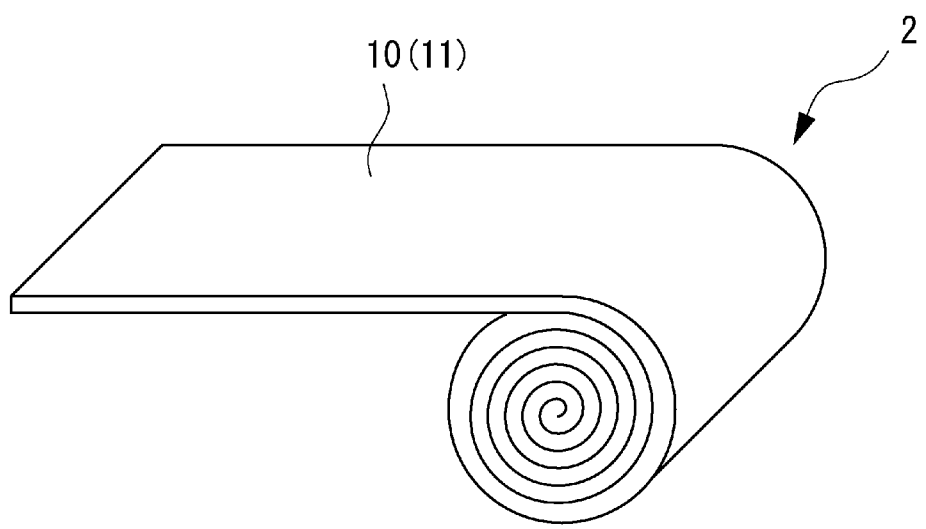
FIG. 4 is a perspective view of the roll body of the light diffusion control sheet according to an embodiment of the present invention.

FIG. 4 illustrates a perspective view of an example of the roll body of the light diffusion control sheet according to an embodiment of the present invention. Roll body 2 according to the present embodiment is obtained by winding a light diffusion control sheet 10 of a long size.

The light diffusion control sheet 10 in the present embodiment has the same optical characteristics as those of the previously described light diffusion control layer 11. That is, in the roll body 2 according to the present embodiment, the diffusion angle width is 5° or more and 80° or less, in which the haze value (%) is 90% or more as measured when one surface of the light diffusion control sheet 10 is irradiated with light rays along the flow direction (drawing out direction) at an incident angle of −70° to 70° with respect to the normal direction of the one surface being 0°.

Furthermore, in the roll body 2 according to the present embodiment, the acute angle is 7° or more and 83° or less, which is defined, when one surface of the light diffusion control sheet 10 is irradiated with incident light perpendicular to the one surface to generate transmitted and diffused light from the other surface, as an angle formed between the longitudinal direction of the light diffusion control sheet 10 and the straight line obtained by projecting a light ray specified as the centroid of the transmitted and diffused light onto the other surface of the light diffusion control sheet 10.

As described above, the light diffusion control sheet in the present embodiment has the same optical characteristics as those of the previously described light diffusion control layer 11. Therefore, the light diffusion control sheet 10 can be used as the previously described light diffusion control layer 11 through drawing out the light diffusion control sheet 10 from the roll body 2 according to the present embodiment and cutting out the light diffusion control sheet 10 into a desired size. In particular, in the roll body 2 according to the present embodiment, the direction in which the diffused and transmitted light is generated is tilted with respect to the longitudinal direction of the light diffusion control sheet 10, and the reflective display body 1 according to the present embodiment can thereby be produced using the light diffusion control layer 11 obtained by cutting out the light diffusion control sheet 10 parallel to (or orthogonally to) the flow direction of the roll body 1 (longitudinal direction of the light diffusion control sheet 10). Thus, by using the roll body 2 according to the present embodiment, it is possible to avoid a complicated process of cutting out the light diffusion control layer 11 and produce the reflective display body 1 having small brightness variation with respect to switching of the up-down direction of the display content while minimizing the generation of scraps of the light diffusion control sheet 10.

Preferred ranges of the above-described optical characteristics of the light diffusion control sheet 10 in the present embodiment is the same as those of the previously described light diffusion control layer 11. That is, provided that the up-down direction of display content on the display surface of the reflective display body 1 coincides with the drawing out direction of the roll body 2, the previously described various physical properties defined for the light diffusion control layer 11 can be applied to the roll body 2. Moreover, the internal structure, composition, thickness, and production method for the light diffusion control sheet 10 in the present embodiment are also the same as those of the previously described light diffusion control layer 11.

The light diffusion control sheet 10 obtained from the roll body 2 according to the present embodiment can be used in the same manner as conventional ones and, for example, the light diffusion control sheet 10 can be used for producing a reflective display body, a liquid crystal display device, an organic light-emitting device, electronic paper, etc. In particular, the light diffusion control sheet 10 in the present embodiment may be preferably used for producing the reflective display body 2 according to the present embodiment.

It should be appreciated that the embodiments heretofore explained are described to facilitate understanding of the present invention and are not described to limit the present invention. It is therefore intended that the elements disclosed in the above embodiments include all design changes and equivalents to fall within the technical scope of the present invention.

EXAMPLES

Hereinafter, the present invention will be described further specifically with reference to examples, etc., but the scope of the present invention is not limited to these examples, etc.

Production Example 1

(1) Preparation of Composition for Light Diffusion Control Layer

Polyether urethane methacrylate having a weight-average molecular weight of 9,900 was obtained as the low refractive index component by reacting polypropylene glycol, isophorone diisocyanate, and 2-hydroxyethyl methacrylate. A composition for light diffusion control layer was obtained through adding 60 mass parts (solid content equivalent value, here and hereinafter) of o-phenylphenoxyethoxyethyl acrylate having a molecular weight of 268 as the high refractive index component and 8 mass parts of 2-hydroxy-2-methyl-1-phenylpropan-1-one as the photopolymerization initiator to 40 mass parts of the above low refractive index component and then heating and mixing them under a condition of 80° C.

(2) Formation of Light Diffusion Control Sheet

As described below, while moving each member such as a sheet on a conveyor, processes such as formation of a coating film of the composition for light diffusion control layer and curing of the coating film were continuously performed. The finally formed light diffusion control sheet (light diffusion control layer) was wound up in accordance with the movement of the conveyor to obtain a roll body of the light diffusion control sheet.

In the first section of the conveyor, a long polyethylene terephthalate sheet as the process sheet was supplied. In the subsequent section, one surface of the process sheet was coated with the composition for light diffusion control layer obtained in the above (1) to form a coating film. Subsequently, the release surface of a release sheet (available from LINTEC Corporation, product name "SP-PET381130," thickness: 38 μm) obtained by release-treating one surface of a polyethylene terephthalate film with a silicone-based release agent was laminated on the surface of the coating film opposite to the process sheet. Thus, a laminate composed of the release sheet, the above coating film, and the process sheet was obtained.

In the subsequent section, as illustrated in FIG. 3, the above coating film was irradiated with ultraviolet rays. In this section, the optical unit 200 is arranged so that the laminate placed on the conveyor 100 and including the coating film 10' can be irradiated with ultraviolet rays. On the upstream side and downstream side of the conveyor flow with reference to the optical unit 200, the entry-side light-shielding plate 401 and the exit-side light-shielding plate 402 are respectively provided so as to cover the laminate including the coating film 10'. The plurality of irradiation light parallelizing members 300 is provided between the optical unit 200 and the laminate including the coating film 10'.

The above optical unit 200 used was an ultraviolet irradiation device (available from EYE GRAPHICS CO., LTD., product name "ECS-4011GX") in which a linear high-pressure mercury lamp (diameter 25 mm, length 1.6 m, output 20 kW) (linear light source 201) was provided with a cold mirror (light collecting mirror 202) for light collection. The optical unit 200 was further provided with a pair of light source shading plates 203.

The irradiation light parallelizing members 300 are formed by arranging a plurality of plate-shaped members in parallel. Here, the irradiation light parallelizing members were arranged so that when the coating film 10' was viewed in a plan view, the acute angle formed between the flow direction 4 and the extending direction of the plate-shaped members, i.e., $\theta_p$ in FIG. 3(a), would be 45°.

Then, the positions and angles of the light collecting mirror 202 and the light source shading plates 203 were adjusted so that the irradiation angle with respect to the coating film 10' (angle represented by $\theta_i$ in FIG. 3(b)) would be set to 5°. In addition, the position of the optical unit 200 was adjusted so that the distance (distance represented by d in FIGS. 3(a) and 3(b)) between the position of one end of the entry-side light-shielding plate 401 on the downstream side (position at which the laminate including the coating film 10' was exposed from the entry-side light-shielding plate 401) and the position just below the linear light source 201 would be 195 mm.

The irradiation conditions were set as follows: the maximum peak illuminance on the surface of the coating film was 2.00 mW/cm$^2$; and the integrated light amount at the position at which the peak illuminance on the surface was maximum was 53.13 mJ/cm$^2$. Irradiation with the ultraviolet rays from the linear light source 201 was performed using parallel light having a parallelism of 2° or less from the high-pressure mercury lamp having a main peak at a wavelength of 365 nm and other peaks at 254 nm, 303 nm, and 313 nm.

The coating film 10' was cured by being irradiated with the ultraviolet rays under the above conditions, and a light diffusion control sheet (light diffusion control layer) was thus obtained. The thickness of the light diffusion control sheet was 110 μm. The obtained light diffusion control sheet was wound into a roll body in the state of a laminate laminated between the process sheet and the release sheet.

When the cross section of the formed light diffusion control sheet was observed with a microscope and the like, it was confirmed that a column structure in which a plurality of columnar bodies was densely arranged to stand in the entire thickness direction was formed in the light diffusion control sheet. It was also confirmed that the above-described columnar bodies were tilted with respect to the thickness direction of the light diffusion control sheet.

The above-described peak illuminance and integrated light amount were measured using a UV METER (available from EYE GRAPHICS CO., LTD., product name "EYE Ultraviolet Integrated Illuminance Meter UVPF-A1") equipped with a light receiver and installed for the position of the above coating film. The thickness of the light diffusion control sheet was measured using a constant-pressure thickness meter (available from TAKARA SEISAKUSYO, product name "Teclock PG-02J").

Production Example 2

A roll body was produced in the same manner as in Production Example 1 except that the distance d between the position of one end of the entry-side light-shielding plate on the downstream side and the position just below the linear light source was 95 mm.

Production Example 3

A roll body was produced in the same manner as in Production Example 1 except that the distance d between the position of one end of the entry-side light-shielding plate on the downstream side and the position just below the linear light source was 145 mm.

Production Example 4

A roll body was produced in the same manner as in Production Example 1 except that the distance d between the position of one end of the entry-side light-shielding plate on the downstream side and the position just below the linear light source was 245 mm.

Production Example 5

A roll body was produced in the same manner as in Production Example 1 except that the distance d between the position of one end of the entry-side light-shielding plate on the downstream side and the position just below the linear light source was 295 mm.

Production Example 6

A roll body was produced in the same manner as in Production Example 1 except that the irradiation angle $\theta_i$ when the coating film was irradiated with ultraviolet rays was 10° and the distance d between the position of one end of the entry-side light-shielding plate on the downstream side and the position just below the linear light source was 200 mm. In the setting of the distance d: 200 mm in this example, the entry-side light-shielding plate was adjusted so that the coating film would be completely cured at the position at which the coating film was irradiated with ultraviolet rays from the light source. On the other hand, in the setting of each distance d in Production Examples 1 to 5, the entry-side light-shielding plate was adjusted so that the coating film would be completely cured at a position (on the entry side) before the position at which the coating film was irradiated with ultraviolet rays from the light source.

Example 1

From the roll body obtained in Production Example 1, a predetermined amount of the laminate of the process sheet, the light diffusion control sheet, and the release sheet was drawn out and cut out into a rectangular shape having a long side of 6 cm and a short side of 5 cm. In this cutting out, the laminate was cut out so that the flow direction of the roll body and the long side of the above rectangular shape would be parallel to each other. Then, the process sheet and the release sheet were released and removed from the cut-out laminate to obtain a light diffusion control layer formed by cutting out the light diffusion control sheet.

Subsequently, one surface of the light diffusion control layer obtained as above was laminated on the reflective surface of a reflective layer having the same plan-view shape as above (the reflective layer was obtained by vapor-depositing aluminum on the surface of a polyethylene terephthalate film having a thickness of 100 µm so that the thickness of the aluminum would be 300 nm). A reflective display body sample was thus obtained.

In the obtained reflective display body sample, it was assumed that the surface on the light diffusion control layer side was the display surface. It was also assumed that the direction of the long sides of the reflective display body sample coincided with the initial up-down direction of the display content and the direction of the short sides of the reflective display body sample coincided with the initial right-left direction of the display content.

In the measurement of the diffused light distribution of Testing Example 2, which will be described later, as for the roll body of Production Example 1 used, the absolute value of the azimuth angle $\varphi_w$ at the coordinates of the centroid light ray was measured as 11.2° as listed in Table 1. In the reflective display body sample according to Example 1, therefore, considering the above-described method of laminating the light diffusion control layer and the reflection layer, the acute angle formed between the up-down direction of the display content and the straight line (centroid projection line) obtained by projecting the centroid light ray onto the surface of the light diffusion control sheet on the side from which the transmitted and diffused light exits is also 11.2°.

Example 2

A reflective display body sample was obtained in the same manner as in Example 1 except that the roll body obtained in Production Example 2 was used. In this reflective display body sample, the acute angle formed between the centroid projection line and the up-down direction of the display content is 8.9°.

Example 3

A reflective display body sample was obtained in the same manner as in Example 1 except that the roll body obtained in Production Example 3 was used. In this reflective display body sample, the acute angle formed between the centroid projection line and the up-down direction of the display content is 8.6°.

Example 4

A reflective display body sample was obtained in the same manner as in Example 1 except that the roll body obtained in Production Example 4 was used. In this reflective display body sample, the acute angle formed between the centroid projection line and the up-down direction of the display content is 14.0°.

Example 5

A reflective display body sample was obtained in the same manner as in Example 1 except that the roll body obtained in Production Example 5 was used. In this reflective display body sample, the acute angle formed between the centroid projection line and the up-down direction of the display content is 17.2°.

Example 6

From the roll body obtained in Production Example 6, a predetermined amount of the laminate of the process sheet, the light diffusion control sheet, and the release sheet was drawn out and cut out into a rectangular shape having a long side of 6 cm and a short side of 5 cm. In this cutting out, the laminate was cut out so that the angle formed between the flow direction of the roll body and the long side of the above rectangular shape would be 15°. A reflective display body sample was produced in the same manner as in Example 1 except that the light diffusion control layer obtained by the cutting out was used.

In this reflective display body sample, the light diffusion control layer whose absolute value of the azimuth angle $\varphi_w$ at the coordinates of the centroid light ray was measured as 5.9° as listed in Table 1 was further cut out with an angle of 15° and used; therefore, the acute angle formed between the centroid projection line and the up-down direction of the display content is 20.9°, which is the sum of these values.

Comparative Example 1

A reflective display body sample was obtained in the same manner as in Example 1 except that the roll body obtained in Production Example 6 was used. In this reflective display body sample, the acute angle formed between the centroid projection line and the up-down direction of the display content is 5.9°.

<Testing Example 1> (Measurement of Diffusion Angle Width)

For each of the light diffusion control sheets produced in Examples and Comparative Example, a diffusion angle width in which the haze value would be within a predetermined range was measured using a variable haze meter (available from Toyo Seiki Seisaku-sho, Ltd., product name "Haze-Gard-Plus, Variable Haze Meter").

Specifically, from each of the roll bodies produced in Examples and Comparative Example, a predetermined amount of the laminate of the process sheet, the light diffusion control sheet, and the release sheet was drawn out and cut out into a rectangular shape having a long side of 6 cm and a short side of 5 cm. In this cutting out, the laminate was cut out so that the flow direction of the roll body and the long side of the above rectangular shape would be parallel to each other. Then, the process sheet and the release sheet were released and removed from the cut-out laminate to obtain a light diffusion control layer formed by cutting out the light diffusion control sheet.

In the obtained light diffusion control layer, the surface opposite to the surface irradiated with ultraviolet rays in the production was attached to one surface of an alkali-free glass plate (thickness: 1.1 mm) to obtain a laminate. Then, the laminate was installed so that the distance from the integrating sphere aperture in the above variable haze meter to the arrival position of the measurement light would be 62 mm and the alkali-free glass side would face the light source. Then, a change in the haze value (%) was measured by rotating the long-side direction of the light diffusion control layer (flow direction of the roll body) with the width direction of the light diffusion control layer at the above arrival position as a rotation axis. That is, only the tilt angle of the light diffusion control layer was changed thereby to vary the incident angle of the measurement light with respect to the light diffusion control layer, and the haze value (%) was measured at each incident angle. Provided that the incident angle of the measurement light in the normal direction of the laminate was 0° and the rotational direction in which the traveling direction side in the long-side direction of the light diffusion control layer (flow direction of the roll body) approached the light source gave a positive angle, the measurement was performed in a range of −70° to 70°. Details of the measurement conditions were as follows.

Light source: C light source
Measuring diameter: φ18 mm
Diameter of integrating sphere aperture: φ25.4 mm Then, the region of the incident angle at which the measured haze value (%) was 90% or more was specified, and the angles at both ends of the region were specified. Furthermore, the angle range between the angles at both ends was specified as the diffusion angle width. Table 1 lists the angles at both ends and the diffusion angle width thus obtained.

<Testing Example 2> (Measurement of Diffused Light Distribution)

When one surface of the light diffusion control sheet produced in each of Examples and Comparative Example was irradiated with incident light perpendicular to the one surface, the distribution of the transmitted and diffused light generated from the other surface was measured using a small simple scattering measurement device (available from LIGHT TEC, product name "Mini-Diff"). A red LED (wavelength 630 nm) was used as the light source for the measurement.

Specifically, one point (incident point) on one surface of the light diffusion control sheet was irradiated with light at an incident angle of 0°. Here, the surface to be irradiated was a surface opposite to the surface irradiated with ultraviolet rays at the time of producing the light diffusion control sheet. Then, the transmitted and diffused light generated from the other surface of the light diffusion control sheet due to the above irradiation was measured using the above-described small simple scattering measurement device. By this measurement, the directions of individual light rays constituting the transmitted and diffused light were obtained as the azimuth angle φ and polar angle θ of the polar coordinate system, and the intensities of the light rays were obtained. In the above polar coordinate system, it is assumed that the downstream direction of the flow at the time of producing the light diffusion control sheet is set to an azimuth angle of φ=0° and the azimuth angle φ increases counterclockwise with reference to the azimuth angle φ=0°.

Subsequently, using the above measurement results, the coordinates of the light ray as the centroid of the transmitted and diffused light were specified from the following Equations (1) and (2).

[Equation 1]

$$\theta_{xw} = \frac{\sum_{\theta_x}[L_x(\theta_x)\theta_x]}{\sum_{\theta_x}L_x(\theta_x)} \quad (1)$$

[Equation 2]

$$\theta_{yw} = \frac{\sum_{\theta_y}[L_y(\theta_y)\theta_y]}{\sum_{\theta_y}L_y(\theta_y)} \quad (2)$$

The $\theta_x$ and $\theta_y$ in Equations (1) and (2) are obtained by converting the azimuth angle φ and polar angle θ obtained for each light ray to a polar angle component ($\theta_x$) when the azimuth angle φ=0° and a polar angle component ($\theta_y$) when the azimuth angle φ=90°. $L_x(x)$ and $L_y(y)$ mean the following Equations (3) and (4), respectively. $L(\theta_x, \theta_y)$ in the following Equations (3) and (4) means the intensity of the light ray at the coordinates ($\theta_x, \theta_y$).

[Equation 3]

$$L_x(\theta_x) = \sum_{\theta_y} L(\theta_x, \theta_y) \quad (3)$$

[Equation 4]

$$L_y(\theta_y) = \sum_{\theta_x} L(\theta_x, \theta_y) \quad (4)$$

According to the above Equations (1) and (2), the coordinates of the centroid light ray are obtained as coordinates ($\theta_{xw}, \theta_{yw}$) converted to a polar angle component ($\theta_x$) when the azimuth angle φ=0° and a polar angle component ($\theta_y$) when the azimuth angle φ=90°. The obtained coordinates were reconverted to the coordinates (azimuth angle $\varphi_w$, polar angle $\theta_w$) before conversion to the $\theta_x$ component and the $\theta_y$ component. The polar angle $\theta_w$ thus obtained is listed in Table 1.

In addition, the absolute value was specified from the azimuth angle $\varphi_w$ obtained as above. Table 1 lists the absolute value of the azimuth angle $\varphi_w$ thus obtained. The absolute value of the azimuth angle $\varphi_w$ herein is assumed to be converted in accordance with the value of the azimuth angle $\varphi_w$ as follows:

When the azimuth angle $\varphi_w$ is 0° or more and 90° or less, the azimuth angle $\varphi_w$ itself;

When the azimuth angle $\varphi_w$ is more than 90° and less than 180°, an angle obtained by subtracting the azimuth angle $\varphi_w$ from 180°;

When the azimuth angle $\varphi_w$ is 180°, an angle of 0°;
When the azimuth angle $\varphi_w$ is more than 180° and less than 270°, an angle obtained by subtracting 180° from the azimuth angle $\varphi_w$;
When the azimuth angle $\varphi_w$ is 270°, an angle of 90°; and
When the azimuth angle $\varphi_w$ is more than 270° and less than 360°, an angle obtained by subtracting the azimuth angle $\varphi_w$ from 360°.

The absolute value of the azimuth angle $\varphi_w$ obtained as above corresponds to an acute angle formed between the flow direction when producing the light diffusion control sheet (longitudinal direction of the light diffusion control sheet) and the straight line (centroid projection line) obtained by projecting the centroid light ray onto the surface of the light diffusion control sheet on the side from which the transmitted and diffused light exits.

<Testing Example 3> (Measurement of Reflectance)

For each of the reflective display body samples produced in Examples and Comparative Example, the reflectance was measured using a variable-angle color meter (available from Suga Test Instruments Co., Ltd., product name "Variable-angle color meter VC-2").

Specifically, first, the standard reflective plate attached to the variable-angle color meter was irradiated with light rays from the C light source so that the angle between the light rays and the normal direction of the reflective surface of the standard reflective plate would be 30°, and the amount of light rays reflected in the front direction of the standard reflective plate (direction perpendicular to the reflective surface) was measured and used as a reference value (100%).

Subsequently, the surface of each reflective display body sample on the light diffusion control layer side (surface assumed to be the display surface) was irradiated with light rays from the C light source so that the angle between the light rays and the normal direction of that surface would be 30°, and the amount of light rays reflected in the front direction of the reflective display body sample (direction perpendicular to that surface) was measured. At that time, the measurement was performed for the following two cases: a case (down orientation) in which the light rays were emitted from the upper side in the primary up-down direction of the display content on the reflective display body sample (as previously described, the up-down direction is parallel to the direction of the long sides of the reflective layer); and a case (right orientation) in which the light rays were emitted from the right side. Then, the ratios of the amounts of reflected light rays in the down orientation and the right orientation thus measured to the above reference value were calculated, and these were used as the values of reflectance (%). The results are listed in Table 2.

Furthermore, the average value (%) of the reflectance in the down orientation and the reflectance in the right orientation obtained as above was calculated and used as the brightness. The results are listed in Table 2. In addition, the difference in brightness (%) between the case of the down orientation and the case of the right orientation was calculated based on the following Equation (5). The results are also listed in Table 2.

Difference in brightness (%)=(Absolute value of difference between reflectance in down orientation and reflectance in right orientation)/(Sum of reflectance in down orientation and reflectance in right orientation)×100 (5)

TABLE 1

|  | Angles at both ends (°) | | Diffusion angle width (°) | Coordinates of centroid light ray | |
|---|---|---|---|---|---|
|  | Negative side | Positive side |  | Polar angle $\theta_w$ (°) | Absolute value of azimuth angle $\phi_w$ (°) |
| Production Example 1 | −40.33 | 5.60 | 45.93 | 18.2 | 11.2 |
| Production Example 2 | −32.63 | 10.18 | 42.81 | 9.8 | 8.9 |
| Production Example 3 | −36.83 | 8.00 | 44.83 | 14.1 | 8.6 |
| Production Example 4 | −43.75 | 4.11 | 47.86 | 20.0 | 14.0 |
| Production Example 5 | −47.50 | 2.78 | 50.28 | 20.8 | 17.2 |
| Production Example 6 | −44.67 | 7.00 | 51.67 | 19.3 | 5.9 |

TABLE 2

|  | Type of light diffusion control layer used | Acute angle between centroid projection line and up-down direction of display content (°) | Reflectance (%) | | Brightness (%) | Difference in brightness (%) |
|---|---|---|---|---|---|---|
|  |  |  | Right orientation | Up orientation |  |  |
| Example 1 | Production Example 1 | 11.2 | 134.92 | 289.12 | 212.02 | 36.36 |
| Example 2 | Production Example 2 | 8.9 | 128.50 | 149.92 | 139.21 | 7.69 |
| Example 3 | Production Example 3 | 8.6 | 139.21 | 267.70 | 203.45 | 31.58 |
| Example 4 | Production Example 4 | 14.0 | 115.65 | 234.51 | 175.08 | 33.94 |
| Example 5 | Production Example 5 | 17.2 | 128.50 | 203.46 | 165.98 | 22.58 |
| Example 6 | Production Example 6 | 20.9 | 127.82 | 286.07 | 206.95 | 38.23 |
| Comparative Example 1 | Production Example 6 | 5.9 | 121.73 | 295.20 | 208.47 | 41.61 |

As listed in Table 2, in the reflective display body samples according to Examples, the difference in brightness between the case of emitting light rays in the down orientation and the case of emitting light rays in the right orientation was able to be suppressed as compared with the reflective display body sample according to Comparative Example. Moreover, it has been found that the reflective display body samples according to Examples can reflect the reflected light having sufficient brightness.

It has also been found that according to the roll bodies of light diffusion control sheets of Production Examples 1 to 5, when the light diffusion control layers are cut out, it is possible to produce the reflective display bodies in which the occurrence of a difference in brightness is suppressed without cutting out at an angle.

INDUSTRIAL APPLICABILITY

The reflective display body of the present invention is suitably used for the production of an information terminal, such as a smartphone or a tablet, which is configured such that the up-down direction of the display content can be changed. Moreover, the roll body of the light diffusion control sheet of the present invention is suitably used for the production of such a reflective display body.

DESCRIPTION OF REFERENCE NUMERALS

1 Reflective display body
2 Roll body of light diffusion control sheet
  10 Light diffusion control sheet
  11 Light diffusion control layer
  12 Reflective layer
  13 Display device
3 Direction (up-down direction of display content)
4 Flow direction
100 Conveyor
200 Optical unit
  201 Linear light source
  202 Light collecting mirror
  203 Light source shading plate
300 Irradiation light parallelizing member
401 Entry-side light-shielding plate
402 Exit-side light-shielding plate
A Transmitted and diffused light
B Light ray that is centroid

What is claimed is:

1. A reflective display body configured such that an up-down direction of display content on a display surface can be changed, the reflective display body comprising:
a light diffusion control layer;
a display device provided on one surface side of the light diffusion control layer; and
a reflective layer provided on a surface side of the display device opposite to the light diffusion control layer, wherein
the light diffusion control layer has a diffusion angle width of 5° or more and 80° or less in which a haze value (%) is 90% or more as measured when one surface of the light diffusion control layer is irradiated with light rays at an incident angle of −70° to 70° with respect to a normal direction of the one surface being 0°, and
the light diffusion control layer has an acute angle of 7° or more and 83° or less, the acute angle being defined as an angle formed between the up-down direction of the display content and a straight line obtained by projecting a light ray specified as a centroid of a transmitted and diffused light onto an other surface of the light diffusion control layer, and when the one surface of the light diffusion control layer is irradiated with incident light perpendicular to the one surface, the transmitted and diffused light is generated from the other surface.

2. The reflective display body according to claim 1, wherein the light diffusion control layer has a regular internal structure that includes a plurality of regions having a relatively high refractive index in a region having a relatively low refractive index.

3. The reflective display body according to claim 2, wherein the regular internal structure is a column structure that includes a plurality of columnar bodies densely arranged to stand in the region having the relatively low refractive index.

4. The reflective display body according to claim 1, wherein
the reflective display body includes a front light provided on a surface side of the light diffusion control layer opposite to the display device,
the front light comprises: a light guide member that covers the display surface; and a light source that is in contact with the light guide member and is located at least at a part of a peripheral edge portion of the display surface, and
the light source exists at a position at which a straight line passing through the center of the light source and the center of the display surface is not parallel to any of the up-down direction and right-left direction of the display content when the display surface is viewed in a plane.

5. The reflective display body according to claim 2, wherein
the reflective display body includes a front light provided on a surface side of the light diffusion control layer opposite to the display device,
the front light comprises: a light guide member that covers the display surface; and a light source that is in contact with the light guide member and is located at least at a part of a peripheral edge portion of the display surface, and
the light source exists at a position at which a straight line passing through the center of the light source and the center of the display surface is not parallel to any of the up-down direction and right-left direction of the display content when the display surface is viewed in a plane.

6. The reflective display body according to claim 3, wherein
the reflective display body includes a front light provided on a surface side of the light diffusion control layer opposite to the display device,
the front light comprises: a light guide member that covers the display surface; and a light source that is in contact with the light guide member and is located at least at a part of a peripheral edge portion of the display surface, and
the light source exists at a position at which a straight line passing through the center of the light source and the center of the display surface is not parallel to any of the up-down direction and right-left direction of the display content when the display surface is viewed in a plane.

7. A roll body comprising:
a wound light diffusion control sheet, wherein
the light diffusion control sheet has a diffusion angle width of 5° or more and 80° or less in which a haze value (%) is 90% or more as measured when one surface of the light diffusion control sheet is irradiated with light rays at an incident angle of −70° to 70° with respect to a normal direction of the one surface being 0°, and the light diffusion control sheet has an acute angle of 7° or more and 83° or less, the acute angle being defined as an angle formed between a longitudinal direction of the light diffusion control sheet and a straight line obtained by projecting a light ray specified as a centroid of a transmitted and diffused light onto an other surface of the light diffusion control sheet, and when the one surface of the light diffusion control layer is irradiated with incident light perpendicular to the one surface, the transmitted and diffused light is generated from the other surface.

* * * * *